Sept. 24, 1957 W. E. SHOEMAKER 2,807,797
NOISE ELIMINATION IN FM RECORDING
Filed March 14, 1955

INVENTOR
WILLIAM E. SHOEMAKER
BY O. S. Lowd
Walter L. Madden Jr.
ATTORNEYS 2,807,797
Patented Sept. 24, 1957

2,807,797

NOISE ELIMINATION IN FM RECORDING

William E. Shoemaker, Fullerton, Calif., assignor to California Research Corporation, San Francisco, Calif., a corporation of Delaware Application March 14, 1955, Serial No. 493,938

6 Claims. (Cl. 340—174)

Figure 1:
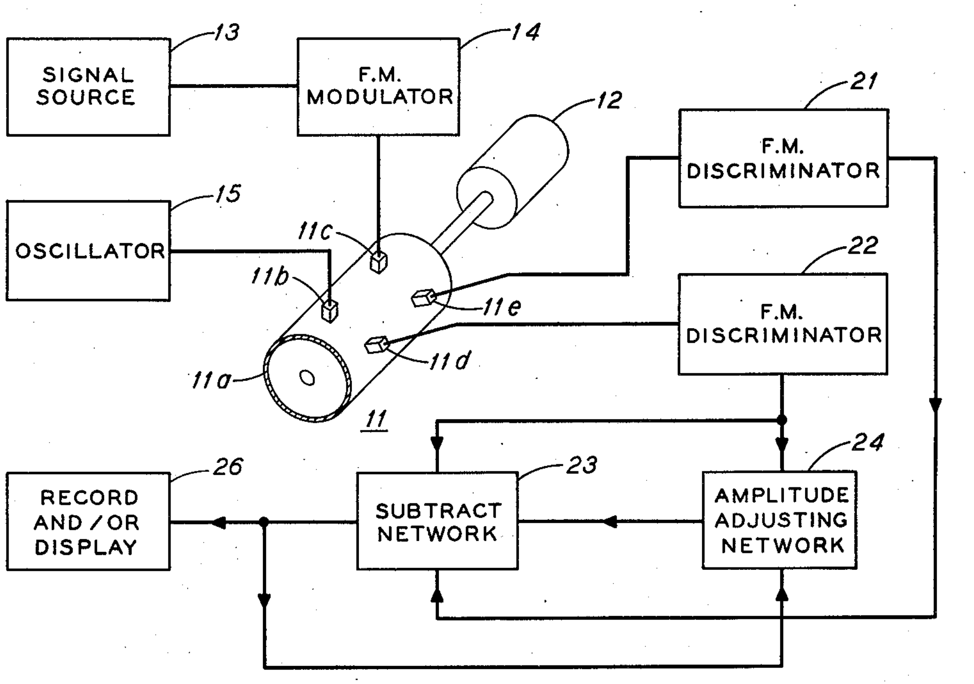

This invention relates in general to methods and apparatus for reproducibly recording frequency modulated signals and relates more particularly to the elimination of noise in such recording and reproducing. In the following description, the term "noise" is applied to the unwanted portion of the information signal.

In the use of reproducible recording media for the storage of information-containing signals, it is preferable to record the signals on such media in the form of frequency modulated signals which may be subsequently demodulated. The use of frequency modulation for such recording is more desirable than direct recording from the standpoint of reduction of noise due to nonlinearities in the magnetic medium, as is well known in the art. Usually the reproducible recording device comprises a recording medium which is movable relative to a recording head, the frequency modulated signals being supplied to the recording head as the recording medium moves relative thereto. One of the most common forms of such device comprises a rotatable cylinder, around the periphery of which is disposed a layer of magnetizable material forming the recording medium. The device is also provided with one or more recording and reproducing heads for recording the frequency modulated signal on the recording medium and reproducing it therefrom. Separate recording and reproducing heads may be provided for each signal channel on the medium, or the function of recording and reproducing may be combined in a single head for each channel, as is well known in the art.

One of the problems encountered in such frequency modulated recording is that variations in the velocity of the recording medium relative to either the recording head during the recording process or to the reproducing head during the play-back process, or both, results in an undesired additional frequency modulation of the signal being recorded or reproduced, so that the undesired frequency modulation appears as noise in the output of the demodulator. Such velocity variations may be produced by vibration of either the recording medium or the recording heads relative to each other or by variations in the speed of the motor driving the recording medium. Another source of such variations in relative velocities is the so-called "normal moveout removal" operation utilized in processing seismic records to compensate for time variations in the different seismic detector signals resulting from the different spacings of the detectors relative to the shot point. In this operation, the recording medium is moving as usual and the recording or reproducing heads are moved during recording or reproducing to effect the desired time compensation in the frequency modulated signals, so there results an additional frequency modulation of the recorded or reproduced signals. This additional frequency modulation, if not eliminated, will result in an undesired amplitude distortion, or noise, in the demodulated signals.

One of the solutions proposed to eliminate this noise produced by the undesired frequency modulation is to record on the recording medium simultaneously with the frequency modulated information signal an auxiliary signal having the same frequency as the center frequency of the information signal. The information signal and the auxiliary signal will both undergo the same frequency variation as the result of any vibrations during recording and reproducing and when the two signals are subsequently reproduced, demodulated and subtracted from each other, there will result a cancellation of a portion of the noise resulting from the vibrations. However, this method does not produce complete cancellation of the noise resulting from vibrations occurring during recording or reproducing since the auxiliary signal does not exactly correspond in frequency to the information signal at all times, as shown by the following.

Assuming that the center frequency of the FM modulator on the information channel is $f_0$ and the variations in frequency about the center frequency are denoted by $\Delta f$, the frequency variation on the information channel will be $f_0 \pm \Delta f$ and the frequency of the signal supplied to the auxiliary channel will be $f_0$. If the nominal velocity of the recording medium relative to the recording or reproducing heads is designated as $v_0$, and any deviation of the velocity from the normal value is designated as $\Delta v$, the velocity $v$ of the recording medium will be $v_0 + \Delta v$ where $\Delta v$ may be either positive or negative. The output from the channel on which the auxiliary signal is recorded will have a frequency $$F_a = f_o + \frac{\Delta v}{v_o} f_o \tag{3}$$

and the output signal of the information channel will have a frequency $$F_i = f_o + \frac{\Delta v}{v_o} f_o + \Delta f + \frac{\Delta v}{v_o} \Delta f \tag{4}$$

When these two output signals are demodulated in suitable FM discriminators, the two voltages corresponding thereto will be respectively $$E_a = k \frac{\Delta v}{v_o} f_o \tag{5}$$

and $$E_i = k \frac{\Delta v}{v_o} f_o + k \Delta f + k \frac{\Delta v}{v_o} \Delta f \tag{6}$$

where $k$ is a constant relating discriminator output voltage to input frequency deviation. When $E_a$ is subtracted from $E_i$ the resulting signal is $$E_s = k \Delta f + \frac{\Delta v}{v_o} \Delta f \tag{7}$$

Although this prior art method does eliminate vibration noise to some extent, it will be seen from Equation 7 that the noise component produced by the vibration effect on the $\Delta f$ component is not canceled. For example, assuming a frequency modulating system operating about a center frequency of 4 kilocycles and modulating within a range of $\pm 3$ kilocycles, the noise cancellation produced by the above prior art method will result in cancellation of vibration noise on the center frequency of 4 kilocycles, but will not compensate for the vibration effects on the deviations of the frequency modulated signal from its center frequency. The lack of exact compensation in this prior art method will be at its greatest value when the information signal is undergoing its maximum deviation from its center frequency, i. e., at 7 kilocycles and at 1 kilocycle so that considerable noise will still exist in the demodulated signal.

Broadly, the present invention is directed to methods and apparatus for substantially completely eliminating the noise produced in reproducibly recorded frequency modulated signals by vibration or other undesired movement of the recording medium relative to the recording or reproducing heads. In accordance with one embodiment of this invention, an auxiliary signal having the same frequency as the center frequency of the modulated information signal is recorded on the recording medium simultaneously with the frequency modulated information signal. Thus, as in the prior art method, both the information signal and the auxiliary signal undergo the same percent frequency variations resulting from vibration during either recording or reproducing of the signals. The two signals are separately reproduced from the reproducible recording medium and separately demodulated in suitable FM discriminators.

The demodulated auxiliary signal is supplied jointly to a subtracting network and to an amplitude adjusting network or losser in which the gain of the auxiliary signal is adjusted in linear accordance with the output voltage of the subtracting network. The output of the amplitude adjusting network is supplied to the subtracting network where it is combined with the demodulated auxiliary signal and subtracted from the demodulated information signal to cancel the noise present in the information signal. The output from the subtracting network then ideally corresponds exactly to the demodulated information signal minus the noise due to any change in the nominal velocity of recording medium with respect to the heads, and a portion of this output is supplied to the amplitude adjusting network to linearly vary the gain of this network.

In an alternate embodiment of the present invention, the auxiliary signal and the information signal are recorded on a single channel of the recording medium and through the selection of suitable frequencies for the different signals and through the use of suitable electrical filter networks, the different signals may be separated after reproduction and utilized in a manner similar to that described above to cancel the noise produced in the information signal during the recording and/or reproducing operations.

It is, therefore, an object of the present invention to provide improved methods and apparatus for eliminating noise in reproducibly recorded frequency modulated signals.

It is a further object of this invention to provide methods of and apparatus for eliminating noise produced in reproducibly recorded frequency modulated signals by variations in the relative velocities of the reproducible recording medium and the recording or reproducing heads in which such noise is substantially completely eliminated for all frequencies of the information signal.

It is an additional object of this invention to provide methods and apparatus for eliminating noise produced in a reproducibly recorded frequency modulated information signal by variations in the relative velocities of the recording medium and the recording or reproducing heads in which an auxiliary signal is recorded and reproduced simultaneously with the information signal and the amplitude of the demodulated auxiliary signal is varied in accordance with its own original amplitude and the amplitude of the demodulated information signal, and the resultant auxiliary signal plus the original auxiliary signal are subtracted from the information signal to cancel the portion thereof produced by velocity variations.

It is a further object of the present invention to provide methods and apparatus for eliminating noise produced in a reproducibly recorded frequency modulated information signal by variations in the relative velocities of the reproducible recording medium and the recording or reproducing heads in which an auxiliary signal having the same frequency as the center frequency of the frequency modulated information signal is recorded and reproduced simultaneously with the information signal and the amplitude of the demodulated auxiliary signal is varied in accordance with its own original amplitude and the amplitude of the demodulated information signal and the resultant auxiliary signal plus the original auxiliary signal are subtracted from the information signal to cancel the portion thereof produced by velocity variations.

It is an additional object of this invention to provide methods and apparatus for eliminating noise produced in a reproducibly record frequency modulated information signal by variations in the relative velocities of the reproducible recording medium and the recording or reproducing heads in which an auxiliary signal is recorded and reproduced simultaneously with and on the same channel as the information signal and the different signals are separated by filter networks prior to demodulation of the signals and subtraction of the resultant auxiliary signal plus the original auxiliary signal from the information signal.

Figure 2:
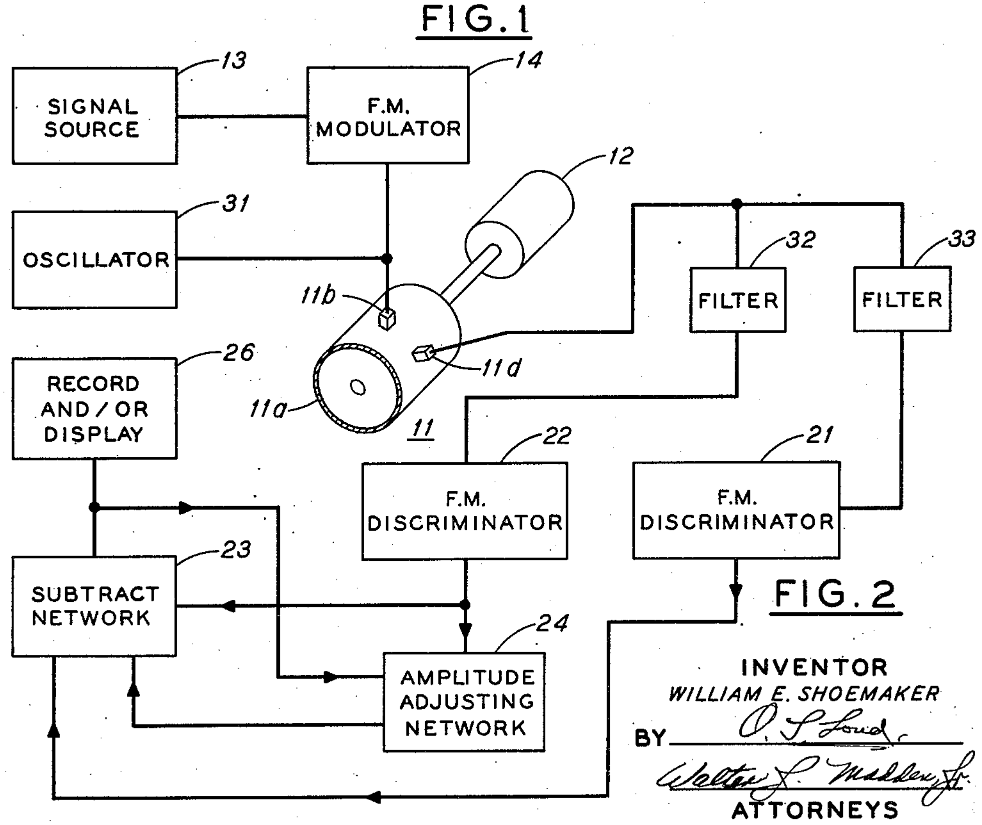

Objects and advantages other than those set forth above will be readily apparent from the following description when read in connection with the accompanying drawing, in which:

Fig. 1 schematically illustrates one embodiment of the present invention in which the information signal and the auxiliary signal are separately recorded and reproduced, and Fig. 2 schematically illustrates an alternate embodiment of the present invention in which the auxiliary signal and the information signal are simultaneously recorded on and reproduced from a single channel on the recording medium and are subsequently separated by filtering networks.

Referring to Fig. 1 by character of reference, numeral 11 denotes a reproducible recording device on which the frequency modulated information signal and auxiliary signal are to be recorded. Device 11 may be of any suitable known type such as a cylinder having a layer 11*a* of magnetizable material around the periphery thereof on which the signals may be recorded by a pair of recording heads 11*b* and 11*c*. Device 11 may also be provided with a pair of reproducing heads 11*d* and 11*e* corresponding respectively to recording heads 11*b* and 11*c*. Although separate recording and reproducing heads for each channel have been illustrated, it will be apparent to those skilled in the art that the function of recording and reproducing may be combined into a single head for each channel. Recording medium 11*a* is driven at a substantially constant velocity by a motor 12.

The source of information to be recorded may be of any suitable known type, and is designated generally at 13, for producing a signal having an amplitude varying as a function of time. For example, element 13 may be a seismic wave detector which produces an electrical output signal varying in sympathy with movement of the earth in response to a seismic disturbance. The signal from signal source 13 is supplied to a suitable FM modulating device 14 where the amplitude variations in the signal produce corresponding frequency variations in the output of modulator 14. The frequency modulated information signal from modulator 14 is supplied to recording head 11*c* to record the frequency modulated information signal on the associated recording channel of medium 11*a*. An oscillator 15, which produces a signal having the same frequency as the center frequency of modulator 14, is connected to recording head 11*b* so that an auxiliary signal of this center frequency is supplied to recording head 11*b*.

Reproducing head 11*e* is connected to a suitable FM discriminator 21 for demodulating the reproduced signal to produce a signal corresponding to the information signal from source 13 plus whatever noise has been superposed on this signal in the recording and reproducing operation. Reproducing head 11*d* is connected to an FM discriminator 22 for demodulation of a signal comprising the auxiliary signal plus whatever noise has been superposed on the auxiliary signal during recording and reproducing. The output from discriminator 22 is supplied jointly to a subtracting network 23 and an amplitude adjusting network 24. Amplitude adjusting network 24 provides means for varying the gain of a signal passed therethrough in accordance with a control input quantity, and network 24 operates in a manner similar to a well-known losser network to provide a variable gain as a function of the magnitude of the control input quantity, as will be more fully described below.

The output from amplitude adjusting network 24 is supplied to subtracting network 23 where it is algebraically combined with the demodulated signal from discriminator 22. The output from discriminator 21 is supplied as another input to subtracting network 23, and the polarities of the three input voltages to network 23 are such that the signals from discriminator 22 and amplitude adjusting network 24 are subtracted from the signal from discriminator 21. The output from subtracting network 23 is supplied jointly to a recording and/or display network 26 and to the control input terminal of amplitude adjusting network 24. The output from subtracting network 23 supplied to amplitude adjusting network 24 acts as the control quantity which controls the gain of network 24 to vary the amplitude of the signal supplied from discriminator 22 through network 24 to subtracting network 23. Thus, the amplitude of the signal passing through network 24 from discriminator 22 to subtracting network 23 is varied as a function of the amplitude of the output signal from network 23.

The operation of the embodiment illustrated in Fig. 1 is as follows: Source 13 generates a signal which is supplied to modulator 14 to produce the frequency modulated information signal. Assuming that modulator 14 operates about a center frequency of $f_0$ and operates through a range of $\pm\Delta f$, the frequency of the output of modulator 14 may be represented as (8) $$f_i=f_0\pm\Delta f$$

Similarly, the auxiliary signal output of oscillator 15, which operates on the center frequency $f_0$ of modulator 14, may be written as $f_0$. Any variations, $\Delta v$, in the nominal velocity $v_o$ of recording medium 11*a* relative to either heads 11*b* and 11*c* during recording or heads 11*d* and 11*e* during reproducing will result in additional frequency variations in the information signal and the auxiliary signal. The frequencies of the resultant information signal and auxiliary signal may be represented, respectively, (9) $$f_i=f_o\pm\Delta f+\frac{\Delta v}{v_o}f_o+\frac{\Delta v}{v_o}\Delta f$$

and

(10) $$f_a=f_o+\frac{\Delta v}{v_o}f_o$$

When these two signals are demodulated in discriminators 21 and 22, respectively, the output voltages from the discriminators may be represented as

(11) $$E_i=\pm k\Delta f+k\frac{\Delta v}{v_o}f_o+k\frac{\Delta v}{v_o}\Delta f$$

and

(12) $$E_a=k\frac{\Delta v}{v_o}f_o$$

where $k$ is a constant relating discriminator output to the input frequency deviation.

The output voltage corresponding to Equation 12 is supplied jointly to subtracting network 23 and to amplitude adjusting network 24, and the output from discriminator 21 is supplied to another input of subtracting network 23. The resultant output signal voltage, $E_s$, from subtracting network 23 is fed back as a control voltage to amplitude adjusting network 24 to linearly vary the amplitude of the signal supplied to network 24 from discriminator 22 in accordance with variations in the signal voltage output of network 23. Amplitude adjusting network 24 has a gain of $E_s/kf_o$, so that multiplication of the input quantity to network 24 from discriminator 22, represented by Equation 12, by the gain of network 24, represented by $E_s/kf_o$, results in an output from amplitude adjusting network 24 corresponding to

(13) $$E_{24}=\frac{E_s}{kf_o}E_a$$

$$E_{24}=\frac{E_s}{kf_o}\left(k\frac{\Delta v}{v_o}f_o\right)=E_s\frac{\Delta v}{v_o}$$

Subtraction of Equations 12 and 13 from Equation 11 results in the quantity

(14) $$E_s=k\Delta f$$

which represents the noise-free information signal and corresponds to the output of subtracting network 23.

Thus, it will be seen that the present invention operates to effectively cancel all the noise an amplitude distortion produced in the information signal by variations in the relative velocities of the recording medium and the recording or reproducing heads regardless of the portion of the frequency range in which the information channel modulator is operating at the time of generation of the noise. The degree of accuracy of the correction introduced by the present invention is, of course, dependent upon how accurate a losser or amplitude adjusting network 24 is utilized, since this network ideally should produce instantaneous variations in the amplitude of the signal passed therethrough from discriminator 22 in response to variations in the output signal from substracting network 23.

Fig. 2 illustrates an alternate embodiment of the present invention in which the frequency modulated information signal and the auxiliary signal are simultaneously recorded upon a single channel of recording device 11. As shown in Fig. 2, signal source 13 supplies an amplitude varying signal to modulator 14 which operates on a center frequency of $f_0$ and with a frequency deviation therefrom of $\pm\Delta f$. The output from modulator 14 is supplied to recording head 11*b* of recorder 11. Also connected to recording head 11*b* is an oscillator 31 which generates a constant frequency signal having a frequency of $f_1$ lying outside the band width of modulator 14. The frequency modulated information signal from modulator 14 and the auxiliary signal from oscillator 31 are simultaneously recorded on a single channel of recording medium 11*a* by recording head 11*b*. The two signals are also simultaneously reproduced through reproducing head 11*d*, and the effects of any variations in the relative velocities of recording medium 11*a* and recording head 11*b* or reproducing head 11*d* during the recording or reproducing operations will appear as frequency variations in the signals, in a manner similar to that described above in conjunction with embodiment of Fig. 1. Although a separate recording head and reproducing head have been shown, it will be obvious to those skilled in the art that the functions of recording and reproducing may be combined into a single head, if desired.

The output signal from reproducing head 11*d* is supplied jointly to a pair of parallel connected filter networks 32 and 33 which serve to separate the auxiliary signal from the information signal. Filter 32 is designed to pass the auxiliary signal with its attendant noise and to reject the information signal and its attendant noise, while filter 33 operates in just the reverse manner to pass the information signal plus its noise and reject the auxiliary signal plus its noise. The output from filter 32 is supplied to discriminator 22 where the auxiliary signal is demodulated and supplied jointly to amplitude adjusting network 24 and subtracting network 23. The information signal from filter 33 is demodulated in discriminator 21 and supplied to one of the inputs of subtracting network 23. The output from subtracting network 23 is supplied jointly to recording device 26 and to the input of amplitude adjusting network 24 to control the gain of network 24 in response to variations in the amplitude of the output of network 23. Thus, the embodiment illustrated in Fig. 2 operates in a manner similar to that described above in connection with the embodiment of Fig. 1 to effectively eliminate the noise produced in the frequency modulated information signal by variations in the relative velocities of recording medium 11*a* and recording head 11*b* or reproducing head 11*d*.

Although but a few embodiments of the present invention have been illustrated and described, it will be apparent to those skilled in the art that various changes and modifications may be made without departing from the spirit of the invention or the scope of the appended claims.

I claim:

1. Apparatus for eliminating noise from a frequency modulated information signal which is modulated in frequency in accordance with variations in the amplitude of the information and which is recorded on a magnetic recording medium movable relative to recording and reproducing means comprising means for recording on said medium simultaneously with said information signal an auxiliary signal having a predetermined frequency, means for reproducing said information signal and said auxiliary signal from said medium, means for demodulating said reproduced signals, a subtracting network, an amplitude adjusting network, means for supplying said demodulated auxiliary signal jointly to said subtracting network and to said amplitude adjusting network, means for controlling the gain of said amplitude adjusting network in accordance with variations in the amplitude of the output of said subtracting network, means for supplying the variable amplitude output signal from said amplitude adjusting network to said subtracting network, and means for supplying said demodulated information signal to said subtracting network to subtract said auxiliary signal and said variable amplitude signal from said information signal, whereby noise caused by variations in the relative velocities of said recording medium and said recording and reproducing means is cancelled from said output of said subtracting network.

2. Apparatus for eliminating noise from a frequency modulated information signal which is modulated in frequency in accordance with variations in the amplitude of the information and which is recorded on a magnetic recording medium movable relative to recording and reproducing means comprising means for recording on said medium simultaneously with said information signal an auxiliary signal having a predetermined frequency, means for reproducing said information signal and said auxiliary signal from said medium, means for demodulating said reproduced signals, a subtracting network, an amplitude adjusting network, means for supplying said demodulated auxiliary signal jointly to said subtracting network and to said amplitude adjusting network, means for controlling the gain of said amplitude adjusting network in linear accordance with variations in the amplitude of the output of said subtracting network, means for supplying the variable amplitude output signal from said amplitude adjusting network to said subtracting network, and means for supplying said demodulated information signal to said subtracting network to subtract said auxiliary signal and said variable amplitude signal from said information signal, whereby noise caused by variations in the relative velocities of said recording medium and said recording and reproducing means is cancelled from said output of said subtracting network.

3. Apparatus for eliminating noise from a frequency modulated information signal which is modulated in frequency about a predetermined center frequency in accordance with variations in the amplitude of the information and which is recorded on a magnetic recording medium movable relative to recording and reproducing means comprising means for recording on said medium simultaneously with said information signal an auxiliary signal having a frequency equal to said center frequency, means for reproducing said information signal and said auxiliary signal from said medium, means for demodulating said reproduced signals, a subtracting network, an amplitude adjusting network, means for supplying said demodulated auxiliary signal jointly to said subtracting network and to said amplitude adjusting network, means for controlling the gain of said amplitude adjusting network in accordance with variations in the amplitude of the output of said subtracting network, means for supplying the variable amplitude output signal from said amplitude adjusting network to said subtracting network, and means for supplying said demodulated information signal to said subtracting network to subtract said auxiliary signal and said variable amplitude signal from said information signal, whereby noise caused by variations in the relative velocities of said recording medium and said recording and reproducing means is cancelled from said output of said subtracting network.

4. Apparatus for eliminating noise from a frequency modulated information signal which is modulated in frequency about a predetermined center frequency in accordance with variations in the amplitude of the information and which is recorded on a magnetic recording medium movable relative to recording and reproducing means comprising means for recording on said medium simultaneously with said information signal an auxiliary signal having a frequency equal to said center frequency, means for reproducing said information signal and said auxiliary signal from said medium, means for demodulating said reproduced signals, a subtracting network, an amplitude adjusting network, means for supplying said demodulated auxiliary signal jointly to said subtracting network and to said amplitude adjusting network, means for controlling the gain of said amplitude adjusting network in linear accordance with variations in the amplitude of the output of said subtracting network, means for supplying the variable amplitude output signal from said amplitude adjusting network to said subtracting network, and means for supplying said demodulated information signal to said subtracting network to subtract said auxiliary signal and said variable amplitude signal from said information signal, whereby noise caused by variations in the relative velocities of said recording medium and said recording and reproducing means is cancelled from said output of said subtracting network.

5. Apparatus for eliminating noise from a frequency modulated information signal which is modulated in frequency about a predetermined center frequency, in accordance with variations in the amplitude of the information and which is recorded on a magnetic recording medium movable relative to recording and reproducing means comprising means for recording on said medium simultaneously with said information signal an auxiliary signal having a frequency different from said center frequency, means for reproducing said information signal and said auxiliary signal from said medium, filtering means for separating said information signal and said auxiliary signal, means for demodulating said reproduced signals, a subtracting network, an amplitude adjusting network, means for supplying said demodulated auxiliary signal jointly to said subtracting network and to said amplitude adjusting network, means for controlling the gain of said amplitude adjusting network in accordance with variations in the amplitude of the output of said subtracting network, means for supplying the variable amplitude output signal from said amplitude adjusting network to said subtracting network, and means for supplying said demodulated information signal to said subtracting network to subtract said auxiliary signal and said variable amplitude signal from said information signal, whereby noise caused by variations in the relative velocities of said recording medium and said recording and reproducing means is cancelled from said output of said subtracting network.

6. Apparatus for eliminating noise from a frequency modulated information signal which is modulated in frequency about a predetermined center frequency in accordance with variations in the amplitude of the information and which is recorded on a magnetic recording medium movable relative to recording and reproducing means comprising means for recording on the same channel of said medium simultaneously with said information signal an auxiliary signal having a frequency different from said center frequency, means for reproducing said information signal and said auxiliary signal from said medium, filtering means for separating said reproduced signals, means for demodulating said separated signals, a subtracting network, an amplitude adjusting network, means for supplying said demodulated auxiliary signal jointly to said subtracting network and to said amplitude adjusting network, means for controlling the gain of said amplitude adjusting network in accordance with variations in the amplitude of the output of said subtracting network, means for supplying the variable amplitude output signal from said amplitude adjusting network to said subtracting network, and means for supplying said demodulated information signal to said subtracting network to subtract said auxiliary signal and said variable amplitude signal from said information signal, whereby noise caused by variations in the relative velocities of said recording medium and said recording and reproducing means is cancelled from said output of said subtracting network.

References Cited in the file of this patent

UNITED STATES PATENTS

| | | |
|---|---|---|
| 2,668,283 | Mullin | Feb. 2, 1954 |
| 2,685,079 | Hoeppner | July 27, 1954 |